Patented Apr. 22, 1924.

1,491,466

UNITED STATES PATENT OFFICE.

JAMES L. DILLON, OF LEAVENWORTH, KANSAS, ASSIGNOR OF ONE-HALF TO LEE BOND AND ONE-FOURTH TO OTTO HESSE, BOTH OF LEAVENWORTH, KANSAS.

BEARING COMPOSITION.

No Drawing. Application filed December 18, 1922. Serial No. 607,755.

*To all whom it may concern:*

Be it known that I, JAMES L. DILLON, a citizen of the United States, residing at Leavenworth, in the county of Leavenworth and State of Kansas, have invented certain new and useful Bearing Compositions, of which the following is a specification.

This invention provides a composition for use as bearings for working parts of machinery, for shafting, for journals generally, and in other places where lubricant ordinarily is required. Bearings formed of the composition do not require oil, grease, graphite, or other lubricant to diminish friction and prevent undue wear of working parts.

The composition includes wood-pulp, powdered or comminuted asbestos, powdered or comminuted graphite, Portland or other hydraulic cement, powdered or comminuted mica, sulphur, and animal blood.

Preferably the pulp of hard wood is used in the composition, and it is introduced during mixing in any form that will permit it to be rendered plastic by moisture. The asbestos is used in the form of a powder or in comparatively small particles or strands. The graphite preferably is used in the form of a fine powder. The cement is used in its commercial form of a fine powder. The mica is used in the form of a powder or comparatively small particles. The sulphur is used in any of the natural forms that are subject to being rendered plastic by moisture. The blood is used in liquid form, and the blood of swine or other animals may be employed.

Ingredients of the composition, together with the animal blood ingredient in quantity sufficient to render the mixture plastic to, or about to, the consistency of ordinary bread dough, are mixed in any suitable manner in substantially the following proportions: Wood-pulp, 10 parts; asbestos, 10 parts; graphite, 5 parts; cement, 5 parts; mica, 2½ parts; and sulphur, 1 part.

The composition thus formed, and while still in a plastic condition, may be molded in any suitable manner into the particular forms required, and after the molded articles harden or set they may be used as bearings in any places where friction between working parts occurs.

It has been found in practice that bearings of this composition, or having this composition thereon, do not require addition of lubricant thereto to diminish friction and prevent undue wear of parts moving in contact therewith.

Having thus described my invention, what I claim as new, and desire to secure by Letters Patent, is—

1. A material for bearings that includes wood pulp, asbestos, graphite, hydraulic cement, mica, sulphur, and animal blood.

2. Material for bearings formed by mixing wood pulp, asbestos, graphite, hydraulic cement, mica, sulphur, and sufficient liquid to render the mixture plastic during mixing of the ingredients.

3. Material for bearings formed by mixing wood pulp, asbestos, graphite, hydraulic cement, mica, sulphur, and sufficient animal blood to render the mixture plastic during mixing of the ingredients.

4. Material for bearings formed by mixing the following ingredients in substantially the proportions stated; namely: wood pulp, 10 parts; asbestos, 10 parts; graphite, 5 parts; hydraulic cement, 5 parts; mica, 2½ parts, sulphur, 1 part; and sufficient liquid to render the mixture plastic during mixing of the ingredients.

5. Material for bearings formed by mixing the following ingredients in substantially the proportions stated; namely: wood pulp, 10 parts; asbestos, 10 parts; graphite, 5 parts; hydraulic cement, 5 parts; mica, 2½ parts, sulphur, 1 part; and sufficient animal blood to render the mixture plastic during mixing of the ingredients.

In testimony whereof I affix my signature.

JAMES L. DILLON.